(12) United States Patent
Huh

(10) Patent No.: US 10,415,461 B2
(45) Date of Patent: Sep. 17, 2019

(54) DIAPHRAGM TYPE ACTUATOR

(71) Applicant: IHI Corporation, Koto-ku (JP)

(72) Inventor: Jaemin Huh, Koto-ku (JP)

(73) Assignee: IHI Corporation, Koto-ku (JP)

( * ) Notice: Subject to any disclaimer, the term of this patent is extended or adjusted under 35 U.S.C. 154(b) by 25 days.

(21) Appl. No.: 15/566,793

(22) PCT Filed: Mar. 22, 2016

(86) PCT No.: PCT/JP2016/059006
§ 371 (c)(1),
(2) Date: Oct. 16, 2017

(87) PCT Pub. No.: WO2016/170891
PCT Pub. Date: Oct. 27, 2016

(65) Prior Publication Data
US 2018/0094572 A1    Apr. 5, 2018

(30) Foreign Application Priority Data
Apr. 24, 2015   (JP) .................. 2015-089374

(51) Int. Cl.
*F15B 15/10*   (2006.01)
*F02B 37/18*   (2006.01)
(Continued)

(52) U.S. Cl.
CPC ........... *F02B 37/186* (2013.01); *F15B 15/10* (2013.01); *F15B 15/226* (2013.01); *F16K 31/1262* (2013.01); *Y02T 10/144* (2013.01)

(58) Field of Classification Search
CPC ...... F15B 15/10; F15B 15/226; F16K 31/262; F16K 31/1262
(Continued)

(56) References Cited

U.S. PATENT DOCUMENTS 2,802,455 A * 8/1957 Ingres .................. B60T 13/244
                                                         91/373
3,750,855 A     8/1973 Peddinghaus
(Continued)

FOREIGN PATENT DOCUMENTS

CN   101749104 A   6/2010
CN   104373411 A   2/2015
(Continued)

OTHER PUBLICATIONS

International Search Report dated Jun. 28, 2016, in PCT/JP2016/059006 filed Mar. 22, 2016.

*Primary Examiner* — Michael Leslie
(74) *Attorney, Agent, or Firm* — Oblon, McClelland, Maier & Neustadt, L.L.P.

(57) ABSTRACT

Provided is a diaphragm type actuator which drives an operation rod in an axial direction, including: a diaphragm which is connected to the operation rod; a high pressure chamber which is adjacent to one end side of the diaphragm in the axial direction; a low pressure chamber which is adjacent to the other end side of the diaphragm in the axial direction; and a return spring which is provided in the low pressure chamber and urges the diaphragm toward the high pressure chamber. Since an absorption portion is disposed inside the high pressure chamber, a force acting on the diaphragm is absorbed when the diaphragm moves toward the high pressure chamber and stops therein.

4 Claims, 12 Drawing Sheets

(51) Int. Cl.
*F16K 31/126* (2006.01)
*F15B 15/22* (2006.01)

(58) Field of Classification Search
USPC ........................................................ 92/94, 99
See application file for complete search history.

(56) References Cited

U.S. PATENT DOCUMENTS

| | | |
|---|---|---|
| 4,256,019 A | 3/1981 | Braddick |
| 4,945,818 A | 8/1990 | Ware |
| 5,937,730 A * | 8/1999 | Nebel .................... F15B 20/00 92/130 R |
| 2012/0037824 A1 | 2/2012 | Leger et al. |

FOREIGN PATENT DOCUMENTS

| | | |
|---|---|---|
| DE | 25 09 138 A1 | 9/1976 |
| DE | 102 34 403 B4 | 5/2004 |
| JP | 56-165722 A | 12/1981 |
| JP | 63-166704 U | 10/1988 |
| JP | 1-238703 A | 9/1989 |
| JP | 3-50327 A | 3/1991 |
| JP | 3-97542 U | 10/1991 |
| JP | 4-254006 A | 9/1992 |
| JP | 5-89842 U | 12/1993 |
| JP | 7-269512 A | 10/1995 |
| JP | 2011-169298 A | 9/2011 |
| JP | 2015-94313 A | 5/2015 |

* cited by examiner

DIAPHRAGM TYPE ACTUATOR

TECHNICAL FIELD

The present disclosure relates to a diaphragm type actuator.

BACKGROUND ART

Hitherto, as an actuator for opening and closing a valve body of a waste gate valve of a turbo charger of an engine, for example, a diaphragm type actuator is employed (for example, see Patent Document 1). The diaphragm type actuator includes an operation rod which is connected to a valve body, a diaphragm which drives the operation rod, a low pressure chamber and a high pressure chamber which are adjacent to each other with the diaphragm interposed therebetween in the axial direction of the operation rod, and a return spring which is disposed inside the low pressure chamber and urges the diaphragm.

CITATION LIST

Patent Literature

Patent Document 1: Japanese Unexamined Patent Publication No. H7-269512

SUMMARY OF INVENTION

Technical Problem

For example, when the waste gate valve in an opened state is closed, the valve body of the waste gate valve comes into close contact with a valve seat (a seat surface) which is a peripheral edge portion of an opening portion. When a driving force generated by the operation rod is strong, a contact sound is generated when the valve body hits the valve seat. A positive pressure diaphragm type actuator is configured to press the operation rod back by applying a positive pressure to the high pressure chamber. In the positive pressure diaphragm type actuator, there is a need to urge the diaphragm in a direction opposite to a direction in which the operation rod is pressed in order to maintain the valve body of the waste gate valve in a closed state against a pressure inside the high pressure chamber. For that reason, in the positive pressure diaphragm type actuator, a spring coefficient of the return spring is set to high. Thus, since the diaphragm is strongly urged by the return spring, the operation rod is strongly pressed back and thus a force generated when the valve body hits the valve seat increases. As a result, a contact sound generated when the valve seat hits the valve body increases.

The disclosure will describe a diaphragm type actuator capable of reducing a driving force generated when a pressed operation rod returns.

Solution to Problem

An aspect of the disclosure provides a diaphragm type actuator which drives an operation rod in the axial direction of the operation rod, including: a diaphragm which is connected to the operation rod; a high pressure chamber which is adjacent to one end side of the diaphragm in the axial direction; a low pressure chamber which is adjacent to the other end side of the diaphragm in the axial direction; a return spring which is provided in the low pressure chamber and urges the diaphragm toward the high pressure chamber; and an absorption portion which is provided in a wall surface facing the diaphragm in the high pressure chamber.

Advantageous Effects of Invention

According to a diaphragm type actuator of an aspect of the disclosure, it is possible to reduce a driving force generated by an operation rod when the operation rod is returned to one end side.

DESCRIPTION OF EMBODIMENTS

Figure 1:
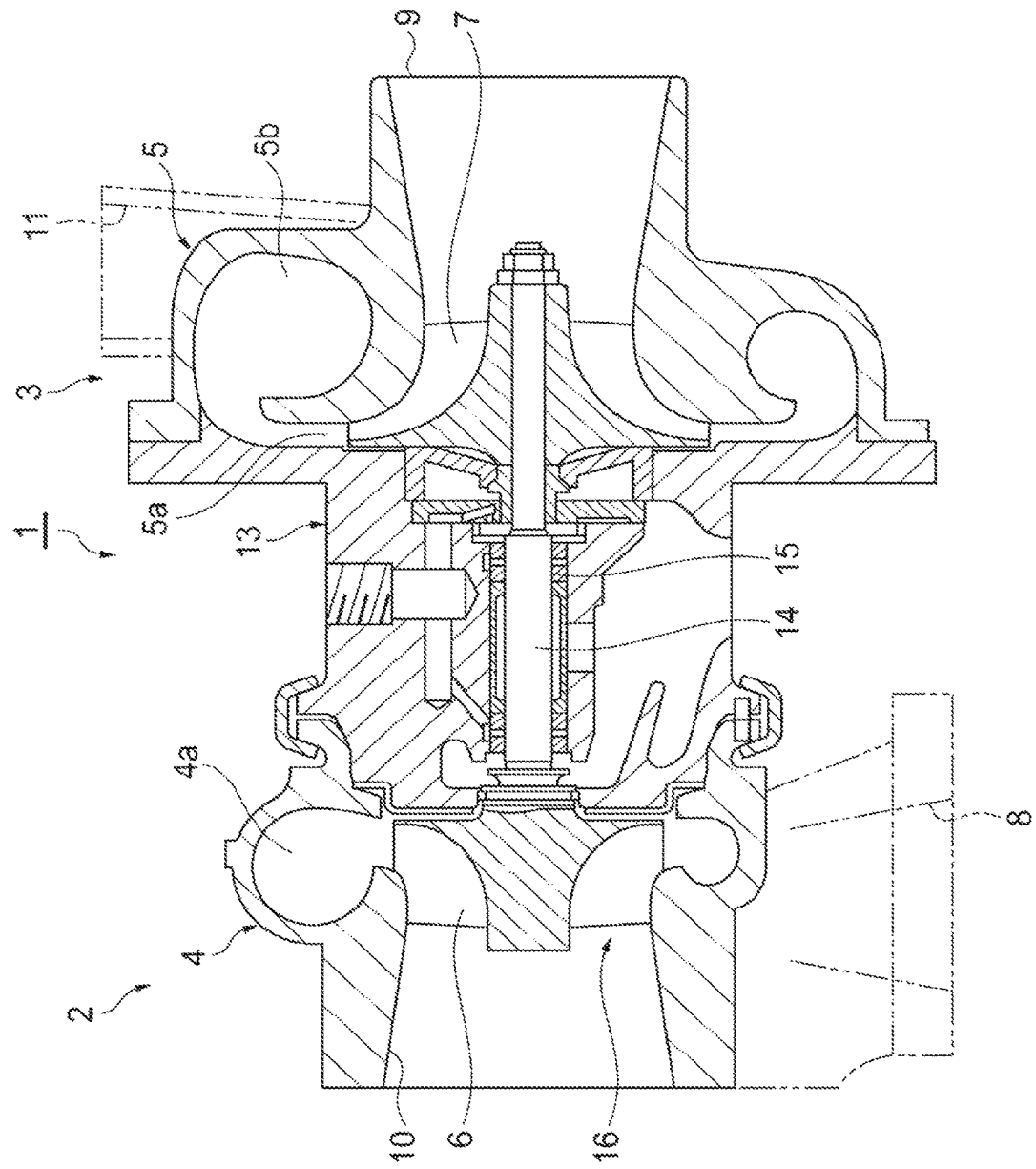
FIG. 1 is a cross-sectional view showing a vehicle turbocharger including a diaphragm type actuator according to an embodiment of the disclosure.

An aspect of the disclosure provides a diaphragm type actuator which drives an operation rod in the axial direction of the operation rod, including: a diaphragm which is connected to the operation rod; a high pressure chamber which is adjacent to one end side of the diaphragm in the axial direction; a low pressure chamber which is adjacent to the other end side of the diaphragm in the axial direction; a return spring which is provided in the low pressure chamber and urges the diaphragm toward the high pressure chamber; and an absorption portion which is provided in a wall surface facing the diaphragm in the high pressure chamber.

In the diaphragm type actuator, when a pressure inside the high pressure chamber decreases, the return spring provided inside the low pressure chamber urges the diaphragm and moves toward the high pressure chamber and the operation rod is driven at one end side. In the diaphragm type actuator, since a force acting on the diaphragm is absorbed by the absorption portion when the diaphragm moves toward the high pressure chamber and stops therein, it is possible to reduce a driving force generated by the operation rod when the operation rod pressed back to the other end side is returned to one end side and stops.

Further, the absorption portion may include an elastic member that is provided in a wall surface facing the diaphragm in the high pressure chamber and is disposed to face the diaphragm in the axial direction. According to this configuration, when the diaphragm moves toward the high pressure chamber and moves to a position closest to the wall surface facing the diaphragm in the high pressure chamber, the diaphragm hits the elastic member. Accordingly, it is possible to reduce a driving force generated by the operation rod by absorbing a force acting on the diaphragm using the elastic member.

Further, the elastic member may include a first elastic portion which is disposed at the other end side and a second elastic portion which is disposed at the one end side and a spring coefficient of the first elastic portion may be lower than a spring coefficient of the second elastic portion. The first elastic portion which is disposed at the other end side inside the high pressure chamber is disposed at a position close to the diaphragm in relation to the second elastic portion disposed at the one side. When the diaphragm moves toward the high pressure chamber, the diaphragm hits the first elastic portion at a timing earlier than the second elastic portion. A force acting on the diaphragm is first absorbed by the first elastic portion having a low spring coefficient and then is absorbed by the second elastic portion having a high spring coefficient. For that reason, when the movement amount of the diaphragm toward the high pressure chamber is small, a force acting on the diaphragm can be absorbed comparatively weakly. When the movement amount of the diaphragm toward the high pressure chamber is further increased, a force acting on the diaphragm can be absorbed more strongly.

The elastic member may be a compression coil spring which is disposed along the axial direction, the compression coil spring may be formed so that the outer diameter of the coil becomes smaller as it goes from one end side toward the other end side, and the first coil disposed at the other end side may be disposed at the inside in the radial direction in relation to the second coil adjacent to one end side of the first coil. According to this configuration, it is possible to decrease the spring coefficient of the compression coil spring as it goes toward the diaphragm. Thus, when the movement amount of the diaphragm toward the high pressure chamber is small, a force acting on the diaphragm can be absorbed comparatively weakly. It is possible to comparatively strongly absorb a force acting on the diaphragm as the movement amount of the diaphragm toward the high pressure chamber increases.

Further, a protrusion portion which protrudes toward the inside of the high pressure chamber from the diaphragm may be provided at one end side of the operation rod. Accordingly, it is possible to reduce a force acting on the diaphragm and the operation rod by pressing the protrusion portion provided at one end side of the operation rod against the absorption portion.

Further, the absorption portion may include an absorption film disposed to face the protrusion portion in the axial direction. Accordingly, it is possible to absorb a force acting on the protrusion portion by pressing the protrusion portion against the absorption film. As a result, it is possible to reduce a force acting on the diaphragm and the operation rod.

Further, a wall surface facing the diaphragm in the high pressure chamber may be provided with a concave portion capable of receiving the protrusion portion and the absorption portion may be disposed in the concave portion. According to this configuration, the protrusion portion can enter the concave portion and the protrusion portion can hit the absorption portion disposed inside the concave portion. Accordingly, it is possible to reduce a force acting on the diaphragm and the operation rod by absorbing a force acting on the protrusion portion while ensuring the movement amount of the protrusion portion.

Hereinafter, embodiments of the disclosure will be described with reference to the drawings. Additionally, the same reference numerals will be given to the same or equivalent portions and a repetitive description thereof will be omitted.

(Turbocharger)

Figure 2:
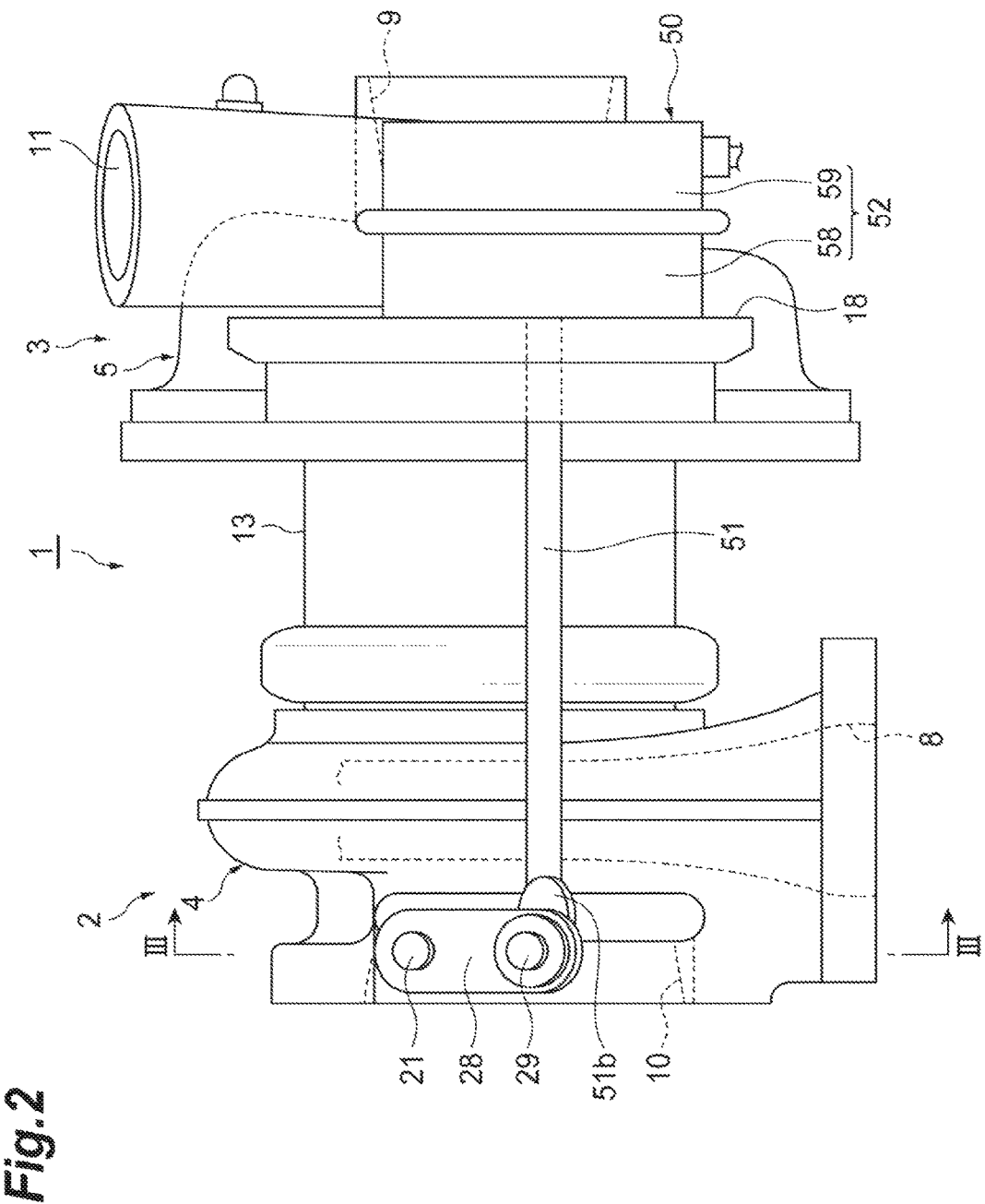
FIG. 2 is a side view showing the vehicle turbocharger shown in FIG. 1 and is a diagram showing the diaphragm type actuator attached to a side surface of the vehicle turbocharger.
Figure 3:
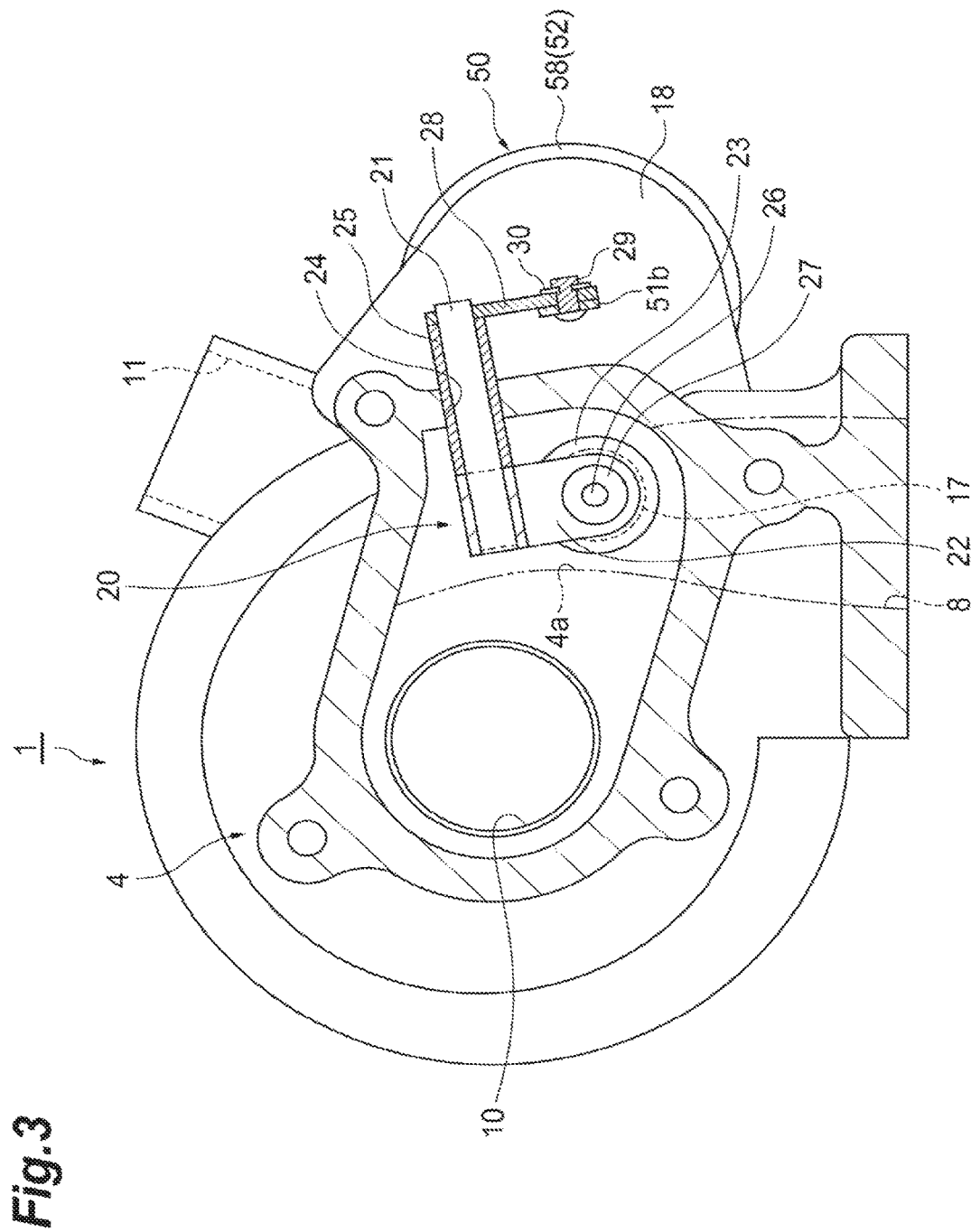
FIG. 3 is a cross-sectional view taken along a line III-III of FIG. 2.

A turbocharger 1 shown in FIGS. 1 to 3 is a vehicle turbocharger and is used to compress air supplied to an engine (not shown) by using an exhaust gas discharged from the engine. The turbocharger 1 includes a diaphragm type actuator 50 which opens and closes a waste gate valve 20 shown in FIG. 3. The turbocharger 1 includes a turbine 2 and a compressor (a centrifugal compressor) 3. The turbine 2 includes a turbine housing 4 and a turbine impeller 6 received in the turbine housing 4. The compressor 3 includes a compressor housing 5 and a compressor wheel 7 received in the compressor housing 5.

The turbine impeller 6 is provided at one end of a rotary shaft 14 and the compressor wheel 7 is provided at the other end of the rotary shaft 14. A bearing housing 13 is provided between the turbine housing 4 and the compressor housing 5. The rotary shaft (the rotor shaft) 14 is rotatably supported by the bearing housing 13 through a bearing 15. The turbocharger 1 includes a turbine rotor shaft 16 and the turbine rotor shaft 16 includes the rotary shaft 14 and the turbine impeller 6 provided at one end of the rotary shaft 14. The turbine rotor shaft 16 and the compressor wheel 7 rotate as a single rotation body.

The turbine housing 4 is provided with an exhaust gas inlet 8 and an exhaust gas outlet 10. An exhaust gas which is discharged from the engine flows into the turbine housing 4 through the exhaust gas inlet 8 to rotate the turbine impeller 6 and then flows out of the turbine housing 4 through the exhaust gas outlet 10.

The compressor housing 5 is provided with a suction port 9 and a discharge port 11. When the turbine impeller 6 rotates as described above, the turbine rotor shaft 16 and the compressor wheel 7 rotate. The rotating compressor wheel 7 suctions external air through the suction port 9, compresses the air, and discharges the air from the discharge port 11. The compressed air which is discharged from the discharge port 11 is supplied to the engine.

As shown in FIGS. 1 and 3, a bypass passage (see FIG. 3) 17 which allows a part of the exhaust gas introduced from the exhaust gas inlet 8 to bypass the turbine impeller 6 and derives the exhaust gas toward the exhaust gas outlet 10 is formed inside the turbine housing 4. The bypass passage 17 is a variable gas flow rate passage which changes the flow rate of the exhaust gas supplied to the turbine impeller 6.

(Waste Gate Valve)

The waste gate valve 20 which is one of variable flow rate valve mechanisms is provided inside the turbine housing 4. The waste gate valve 20 is a valve which opens and closes an opening portion of the bypass passage 17. The waste gate valve 20 includes a stein 21 which is rotatably supported by the outer wall of the turbine housing 4, a swing piece 22 which protrudes in the radial direction of the stem 21 from the stein 21, and a valve body 23 which is supported by the swing piece 22.

The outer wall of the turbine housing 4 is provided with a support hole 24 which penetrates the outer wall in the plate thickness direction. A cylindrical the bush 25 is inserted through the support hole 24. The bush 25 is fixed to the outer wall of the turbine housing 4.

The stem 21 is inserted through the bush 25 and is rotatably supported by the outer wall of the turbine housing 4. The swing piece 22 is fixed to the stein 21. The stein 21 rotates about the axis of the stein 21 to swing the swing piece 22. A front end portion of the swing piece 22 is provided with an attachment hole for attaching the valve body 23 thereto.

The valve body 23 is movable to contact and separate from the peripheral edge portion of the opening portion of the bypass passage 17 and is formed ill, for example, a disk shape. The valve body 23 is provided with a valve shaft 26 which protrudes in a direction opposite to the opening portion of the bypass passage 17. The valve shaft 26 is inserted through the attachment hole of the front end portion of the swing piece 22. A stopper 27 is fixed to an end portion opposite to the valve body 23 in the valve shaft 26 and the valve shaft 26 inserted through the attachment hole is held by the stopper 27. The valve body 23 is supported by the swing piece 22 to be minutely movable (in a motion including tilting). Accordingly, since the valve body 23 minutely moves relative to the swing piece 22, the valve body 23 comes into close contact with the peripheral edge portion (the valve seat) of the opening portion of the bypass passage 17. Then, the valve body 23 comes into contact with the peripheral edge portion of the opening portion of the bypass passage 17 so that the waste gate valve 20 is closed and the valve body 23 is separated from the peripheral edge portion of the opening portion of the bypass passage 17 so that the waste gate valve 20 is opened.

A plate-shaped link member 28 that protrudes in the radial direction of the stem 21 is fixed to an end portion of the stem 21 disposed outside the turbine housing 4. A front end portion of the link member 28 is provided with an attachment hole through which a connection pin 29 is inserted and the connection pin 29 is inserted through the attachment hole. Further, the connection pin 29 is inserted through an attachment hole formed at the other end portion 51b which is a front end portion of an operation rod 51 of the diaphragm type actuator 50. One end portion of the connection pin 29 is fixed to the operation rod 51 by caulking. A clip 30 is attached to the other end portion of the connection pin 29 to prevent the separation of the connection pin 29 from the attachment hole. The stein 21 is connected to the operation rod 51 of the diaphragm type actuator 50 through the link member 28 and the connection pin 29.

(Diaphragm Type Actuator)

Next, the diaphragm type actuator 50 will be described. As shown in FIGS. 2 and 3, the diaphragm type actuator 50 is fixed to a bracket 18 which protrudes laterally from the compressor housing 5.

Figure 4:
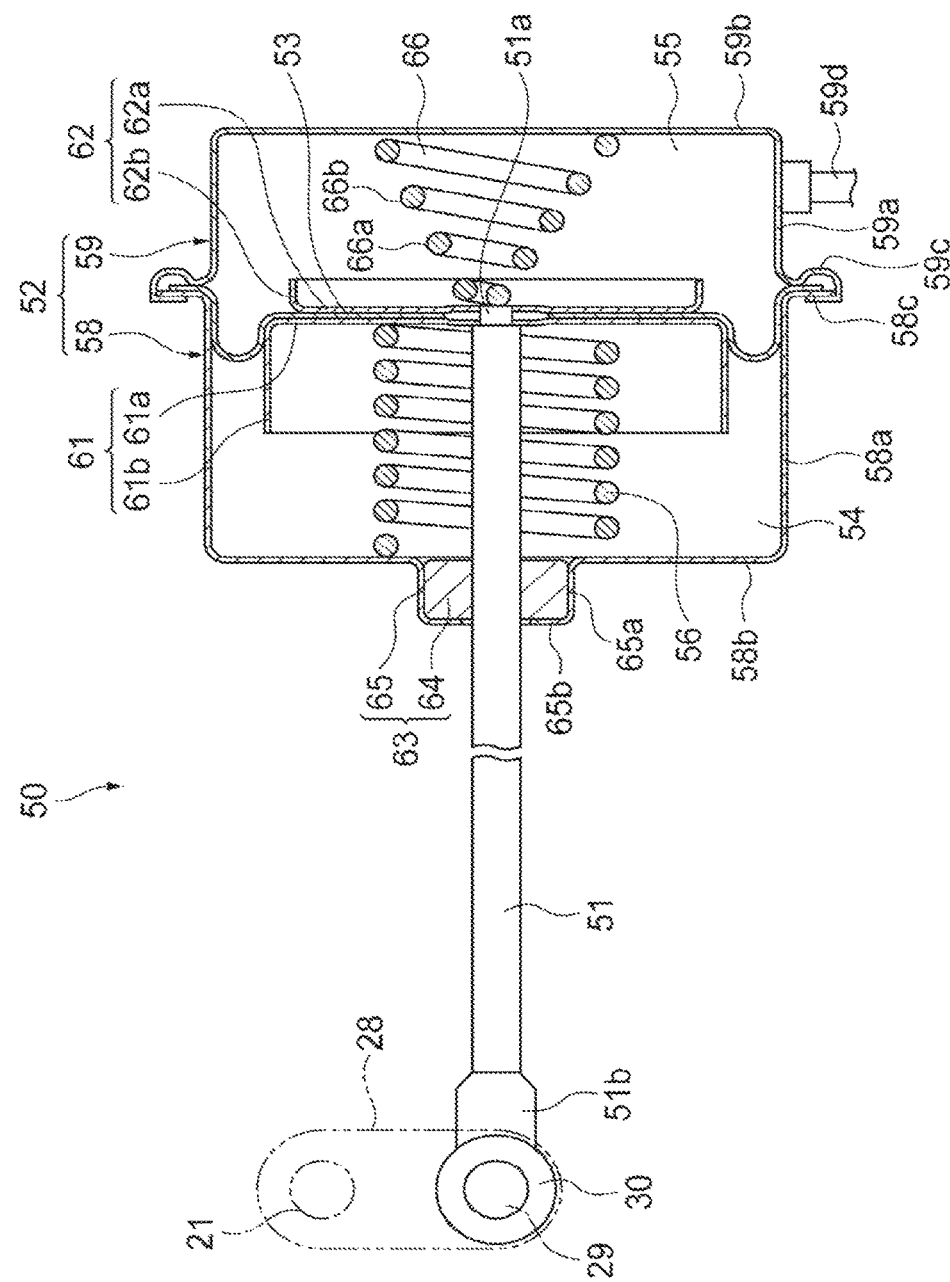
FIG. 4 is a cross-sectional view of a diaphragm type actuator according to a first embodiment of the disclosure.

The diaphragm type actuator 50 includes, as shown in FIG. 4, the operation rod 51 and an actuator body 52 which drives the operation rod 51 in the axial direction. The actuator body 52 includes a diaphragm 53 which is connected to the operation rod 51 and transmits a driving force to the operation rod 51, a high pressure chamber 55 which is adjacent to one side of the diaphragm 53, a low pressure chamber 54 which is adjacent to the other side of the diaphragm 53, and a return spring 56 which is provided inside the low pressure chamber 54 and urges the diaphragm 53 toward the high pressure chamber 55. The operation rod 51 is a bar-shaped member that is driven by the actuator body 52.

The actuator body 52 includes a low pressure side cup portion 58 which forms the low pressure chamber 54 therein and a high pressure side cup portion 59 which forms the high pressure chamber 55 therein. The low pressure side cup portion 58 and the high pressure side cup portion 59 are formed of metal such as iron. The low pressure side cup portion 58 includes a cylindrical portion 58a and a front surface wall 58b which closes the other end side (the left side in the drawing) of the cylindrical portion 58a. One end side of the cylindrical portion 58a is provided with a flange portion 58c which protrudes in the radial direction of the cylindrical portion 58a from the peripheral edge portion of the opening portion. In the specification, "one end side" or the "other end side" simply means a position or a portion based on the axial direction of the operation rod 51.

The high pressure side cup portion 59 includes a cylindrical portion 59a and a rear surface wall 59b which closes one end side (the right side in the drawing) of the cylindrical portion 59a. The other end side of the cylindrical portion 59a is provided with a flange portion 59c which protrudes in the radial direction of the cylindrical portion 59a from the peripheral edge portion of the opening portion. The inner diameter of the cylindrical portion 59a of the high pressure side cup portion 59 corresponds to the inner diameter of the cylindrical portion 58a of the low pressure side cup portion 58. Additionally, the inner diameters of the cylindrical portions 58a and 59a may be the same or different from each other. Further, a center portion of the rear surface wall 59b is provided with an opening portion through which the operation rod 51 is inserted. Further, the cylindrical portion 59a is provided with a nozzle 59d. For example, a pressure obtained by mixing a suction pressure of the compressor housing 5 and a boost control pressure of an engine side pump (not shown) is applied to the nozzle 59d.

The low pressure side cup portion 58 and the high pressure side cup portion 59 are bonded to each other so that the opening portions thereof face each other with the diaphragm 53 interposed therebetween in the axial direction of the operation rod 51. The diaphragm 53 is formed in, for example, a circular shape. The peripheral edge portion of the diaphragm 53 are sandwiched by flange portions 58c and 59c of the low pressure side cup portion 58 and the high pressure side cup portion 59. The flange portions 58c and 59c of the low pressure side cup portion 58 and the high pressure side cup portion 59 are bonded to each other by, for example, caulking. For example, the low pressure side cup portion 58 and the high pressure side cup portion 59 may be bonded to each other by welding, threading, or other methods.

The diaphragm 53 has an outer shape larger than the inner diameters of the cylindrical portions 58a and 59a. Inside the low pressure side cup portion 58 and the high pressure side cup portion 59, a center portion of the diaphragm 53 is movable in the axial direction of the operation rod 51.

A high pressure side retainer 62 is provided at one side surface (the right side in the drawing) of the diaphragm 53 and the low pressure side retainer 61 is provided at the other side surface (the left side in the drawing) of the diaphragm 53. The low pressure side retainer 61 and the high pressure side retainer 62 are formed of, for example, metal such as iron. The low pressure side retainer 61 includes a disk-shaped retainer body 61a which comes into contact with one surface of the diaphragm 53 and a protrusion portion 61b which protrudes in the axial direction of the operation rod 51 from the outer peripheral edge portion of the retainer body 61a. The high pressure side retainer 62 includes a disk-shaped retainer body 62a which comes into contact with the other surface of the diaphragm 53 and a protrusion portion 62b which protrudes in the axial direction of the operation rod 51 from the outer peripheral edge portion of the retainer body 62a. The outer diameter of the retainer body 62a of the high pressure side retainer 62 is smaller than the outer diameter of the retainer body 61a of the low pressure side retainer 61. Further, an opening portion is formed at each of the center portions of the retainer bodies 61a and 62a.

One end portion 51a of the operation rod 51 is connected to the diaphragm 53. Specifically, one end portion 51a of the operation rod 51 is inserted through the opening portion of the low pressure side retainer 61, the opening portion of the diaphragm 53, and the opening portion of the high pressure side retainer 62 and is fixed to the low pressure side retainer 61 and the high pressure side retainer 62 by, for example, caulking. The low pressure side retainer 61 and the high pressure side retainer 62 are supported to sandwich the center portion of the diaphragm 53 from both sides of the operation rod 51 in the axial direction. Additionally, a method of connecting the operation rod 51 and the diaphragm 53 to each other is not limited to a connection method using caulking. For example, the operation rod 51 may be connected to the diaphragm 53 through the low pressure side retainer 61 and the high pressure side retainer 62, by forming a screw portion at one end portion of the operation rod 51 and fastening a nut to the screw portion.

The return spring 56 is, for example, a compression coil spring, one end portion of the return spring 56 comes into contact with the retainer body 61a of the low pressure side retainer 61, and the other end portion of the return spring 56 comes into contact with the front surface wall 58b of the low pressure side cup portion 58. The return spring 56 can be extended and compressed in the axial direction of the operation rod 51 and urges the diaphragm 53 toward the high pressure chamber 55 by urging the low pressure side retainer 61 toward the high pressure chamber 55.

The operation rod 51 extends from the diaphragm 53 toward the low pressure chamber 54, penetrates the front surface wall 58b of the low pressure side cup portion 58, and extends to the outside of the low pressure chamber 54. A bearing portion 63 which holds the operation rod 51 is provided at a position corresponding to the opening portion of the front surface wall 58b.

The bearing portion 63 includes a cylindrical bush 64 and a bush storage portion 65 which stores the bush 64. The bush storage portion 65 includes a cylindrical portion 65a and a front surface wall 65b. The cylindrical portion 65a is disposed to cover the outer peripheral surface of the bush 64. The front surface wall 65b is formed at the other end side of the cylindrical portion 65a to protrude inward in the radial direction. The center portion of the front surface wall 65b is provided with an opening portion through which the operation rod 51 is inserted. The front surface wall 65b is disposed to cover an end surface at the other end side of the bush 64.

One end side of the cylindrical portion 65a is continuous to the front surface wall 58b of the low pressure chamber 54. The bush 64 is disposed to protrude outward in relation to the front surface wall 58b of the low pressure side cup portion 58 in the axial direction of the operation rod 51. Further, an end surface of one end side of the bush 64 is disposed so as not to protrude inward in relation to the front surface wall 58b of the low pressure side cup portion 58.

Here, the diaphragm type actuator 50 includes a compression coil spring (an absorption portion and an elastic member) 66 which is disposed between the high pressure side retainer 62 and the rear surface wall 59b in the axial direction of the operation rod 51 inside the high pressure chamber 55.

The compression coil spring 66 is disposed to be coaxial to the operation rod 51. One end portion of the compression coil spring 66 comes into contact with the inner wall surface of the rear surface wall 59b of the high pressure chamber 55 and the other end portion of the compression coil spring 66 comes into contact with the retainer body 62a of the high pressure side retainer 62. Further, the spring coefficient of the compression coil spring 66 is set to be lower than the spring coefficient of the return spring 56.

As it goes from one end side toward the other end side in the compression coil spring 66, the outer diameter of the coil becomes smaller. In the coils 66a and 66b which are adjacent to each other in the axial direction of the compression coil spring 66, the coil (the first coil) 66a which is disposed at the other end side is disposed at the inside in the radial direction of the coil in relation to the coil (the second coil) 66b which is disposed at one end side. In other words, the outer diameter of the coil 66a is smaller than the inner diameter of the coil 66b. For example, when the compression coil spring 66 is compressed by the shape of the coil spring, the coil 66a is received inside the coil 66b in the radial direction of the coil. Additionally, the radial direction of the coil is a direction orthogonal to the axial direction of the compression coil spring 66. In FIG. 4, since the axial direction of the compression coil spring 66 matches the axial direction of the operation rod 51, the radial direction of the coil becomes a direction orthogonal to the axial direction of the operation rod 51.

Since the compression coil spring 66 has the same wire diameter of the coil and the outer diameter of the coil becomes smaller as it goes from one end side toward the other end side, the spring coefficient can be changed in the axial direction. Specifically, the spring coefficient at a position close to the diaphragm 53 can be set to be low and the spring coefficient at a position close to the rear surface wall 59b can be set to be high. For that reason, when the center portion of the diaphragm 53 starts to move toward the high pressure chamber 55, the diaphragm 53 is urged toward the low pressure chamber 54 by a comparatively weak force through the compression coil spring 66. Then, a force of urging the diaphragm 53 by the compression coil spring 66 increases as the diaphragm 53 moves toward the rear surface wall 59b in accordance with an increase in movement amount of the center portion of the diaphragm 53 toward the high pressure chamber 55. When the diaphragm 53 moves to a position closest to the rear surface wall 59b, an urging force generated by the compression coil spring 66 becomes maximal.

Next, the operation and the effect of the turbocharger 1 will be described.

An exhaust gas which flows from the exhaust gas inlet 8 passes through a turbine scroll flow passage 4a and is supplied to the inlet side of the turbine impeller 6. A rotational force is generated by using a pressure of the exhaust gas supplied to the turbine impeller 6 so that the rotary shaft 14 and the compressor wheel 7 rotate along with the turbine impeller 6. Accordingly, air suctioned from the suction port 9 of the compressor 3 is compressed by using the compressor wheel 7. The air which is compressed by the compressor wheel 7 passes through a diffuser passage 5a and a compressor scroll passage 5b and is discharged from the discharge port 11. The air which is discharged from the discharge port 11 is supplied to the engine.

When a supercharging pressure (a pressure of air discharged from the discharge port 11) reaches a set pressure during the operation of the turbocharger 1, a positive pressure is applied to the high pressure chamber 55 of the diaphragm type actuator 50 by the pump. For example, when a pressure inside the low pressure chamber 54 is an atmospheric pressure, a pressure which is higher than the atmospheric pressure is applied to the high pressure chamber 55. At this time, the pressure inside the high pressure chamber 55 is higher than the pressure inside the low pressure chamber 54 and the diaphragm 53 is urged by the pressure inside the high pressure chamber 55 so that the center portion of the diaphragm 53 moves toward the low pressure chamber 54. The return spring 56 is compressed and the compression coil spring 66 is extended.

In a state where a positive pressure is applied to the high pressure chamber 55, the center portion of the diaphragm 53 moves close to the front surface wall 58b of the low pressure side cup portion 58. The operation rod 51 is pressed toward the other end side in the axial direction and a force (a driving force) which is pressed by the operation rod 51 is transmitted to the valve body 23 through the link member 28, the stem 21, and the swing piece 22 connected to the operation rod 51. Accordingly, the valve body 23 moves so as to be separated from the peripheral edge portion of the opening portion of the bypass passage 17 and the waste gate valve 20 is opened. At this time, a part of the exhaust gas flowing from the exhaust gas inlet 8 passes through the bypass passage 17 and bypasses the turbine impeller 6. For that reason, it is possible to reduce the flow amount of the exhaust gas supplied to the turbine impeller 6.

Then, when the supercharging pressure becomes lower than the set pressure during the operation of the turbocharger 1, a mixing ratio between the suction pressure inside the compressor housing 5 and the boost control pressure of the engine side pump is controlled so that the pressure inside the high pressure chamber 55 decreases and the pressure inside the high pressure chamber 55 becomes close to the pressure inside the low pressure chamber 54. At this time, the return spring 56 in the compressed state is extended and the diaphragm 53 is urged by the return spring 56 so that the center portion of the diaphragm 53 moves toward the high pressure chamber 55.

When the center portion of the diaphragm 53 moves toward the high pressure chamber 55, the operation rod 51 moves toward one end side in the axial direction in accordance with the movement of the center portion of the diaphragm 53. The operation rod 51 is pressed back to one end side in the axial direction and a driving force which is applied in a direction toward one end side and is generated by the operation rod 51 is transmitted to the link member 28. The link member 28 swings about the stem 21 as a center, the stein 21 rotates about the axis, and the swing piece 22 swings. Accordingly, the valve body 23 moves close to the peripheral edge portion of the opening portion of the bypass passage 17 and is pressed against the peripheral edge portion of the opening portion, and the waste gate valve 20 is closed. That is, the bypassing of the exhaust gas using the bypass passage 17 is not performed in the turbine 2.

Then, when the return spring 56 is extended and the center portion of the diaphragm 53 is urged to move toward the high pressure chamber 55, the diaphragm 53 moves while being urged toward the low pressure chamber 54 by the compression coil spring 66. When the diaphragm 53 starts to move toward the high pressure chamber 55, an urging force generated by the compression coil spring 66 is comparatively weak. An urging force generated by the compression coil spring 66 increases in accordance with an increase in movement amount of the diaphragm 53 toward the high pressure chamber 55.

Since the urging force of the compression coil spring 66 is a force which is generated in a direction opposite to that of the urging force of the return spring 56, a force in which the diaphragm 53 is urged by the return spring 56 is absorbed as the diaphragm 53 moves close to the rear surface wall 59b. In a state where the diaphragm 53 moves to a position closest to the rear surface wall 59b, the urging force of the compression coil spring 66 becomes maximal and a force in which the diaphragm 53 is urged toward the high pressure chamber 55 can be weakened. For that reason, it is possible to suppress an influence on the operability of the operation rod 51 when the operation rod 51 moving to a position closest to the other end side starts to move toward one end side.

Thus, a force acting on the diaphragm 53 when the center portion of the diaphragm 53 moves to a position closest to the rear surface wall 59b of the high pressure chamber 55 and stops is absorbed. For that reason, a driving force generated by the operation rod 51 when the operation rod 51 is returned to one end side and stops is reduced. As a result, when the valve body 23 comes into contact with the peripheral edge portion of the opening portion of the bypass passage 17, a force generated when the valve body 23 hits the peripheral edge portion can be weakened and a contact sound generated when the valve body 23 hits the peripheral edge portion can be suppressed.

Second Embodiment

Figure 5:
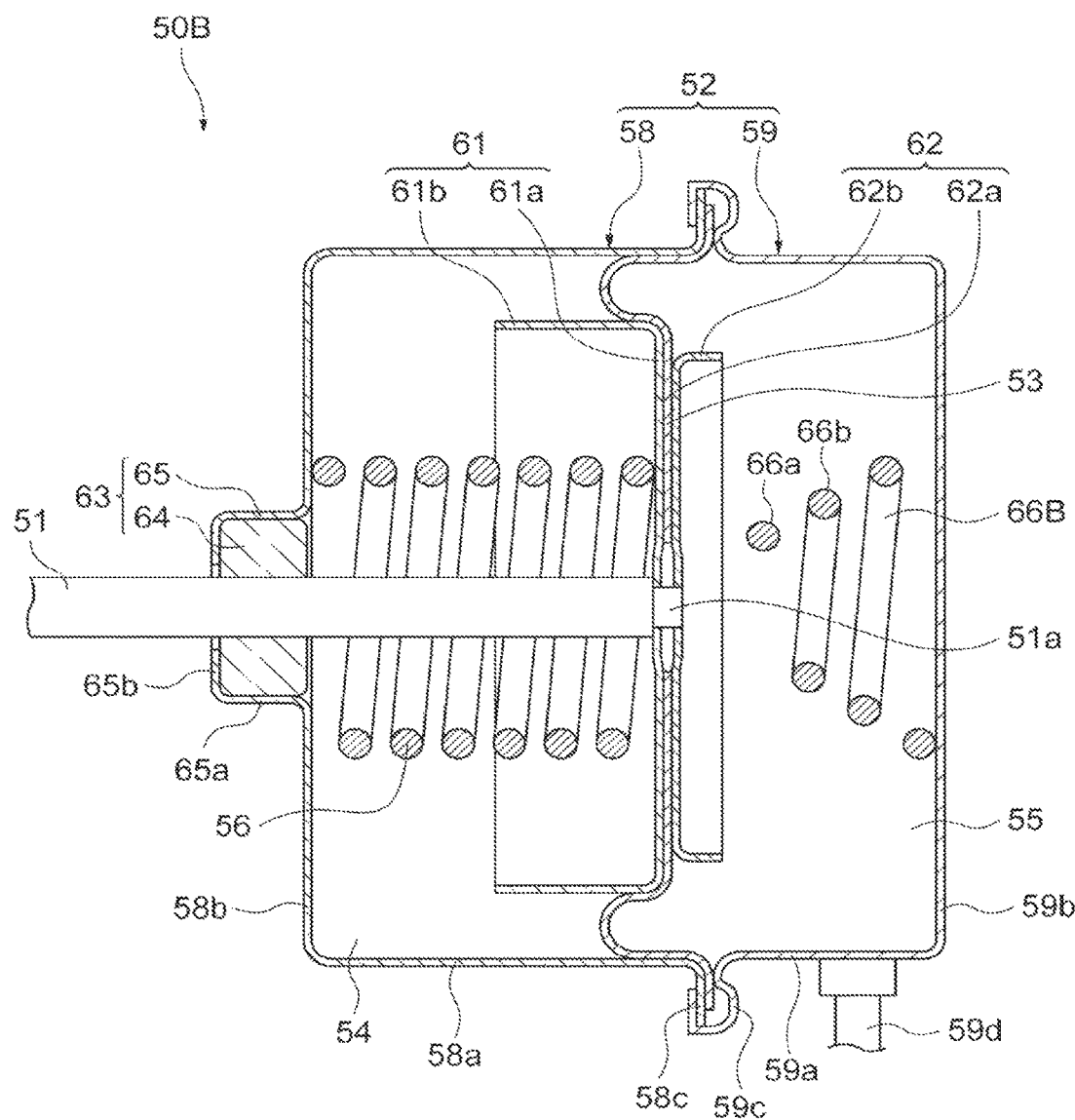
FIG. 5 is a cross-sectional view of a diaphragm type actuator according to a second embodiment of the disclosure.

Next, a diaphragm type actuator 50B according to a second embodiment will be described with reference to FIG. 5. The diaphragm type actuator 50B according to the second embodiment is different from the diaphragm type actuator 50 according to the first embodiment in that a compression coil spring 66B which is shorter than the compression coil spring 66 in the axial direction is provided instead of the compression coil spring 66. Additionally, in the description of the second embodiment, the same description as that of the first embodiment will be omitted.

In the compression coil spring 66B, the number of times of winding the coil is smaller than that of the compression coil spring 66 and the axial length in the extended state is shorter than that of the compression coil spring. One end portion of the compression coil spring 66B is attached to the inner wall surface of the rear surface wall 59b of the high pressure chamber 55 by adhering or the like. The other end portion of the compression coil spring 66B is not fixed to the high pressure side retainer 62.

In a state where a positive pressure is applied to the high pressure chamber 55, the center portion of the diaphragm 53 moves toward the low pressure chamber 54 and the high pressure side retainer 62 and the compression coil spring 66B are separated from each other in the axial direction. When the positive pressure application state in the high pressure chamber 55 is released, the diaphragm 53 moves to the high pressure chamber 55. When the movement amount of the diaphragm 53 toward the high pressure chamber 55 increases, the high pressure side retainer 62 and the compression coil spring 66B contact each other. Accordingly, the compression coil spring 66B urges the diaphragm 53 toward the low pressure chamber 54. In accordance with an increase in movement amount of the diaphragm 53 toward the high pressure chamber 55, a force urged by the compression coil spring 66B increases and a force in which the diaphragm 53 is urged by the return spring 56 can be weakened. As a result, it is possible to reduce a driving force generated when the operation rod 51 moves to one end side and stops by absorbing a force acting on the diaphragm 53.

In this way, also in the diaphragm type actuator 50B of the second embodiment, it is possible to obtain the same operation and effect as those of the diaphragm type actuator 50 of the first embodiment and to suppress a contact sound generated when the valve body 23 hits the peripheral edge portion of the opening portion of the bypass passage 17.

Third Embodiment

Figure 6:
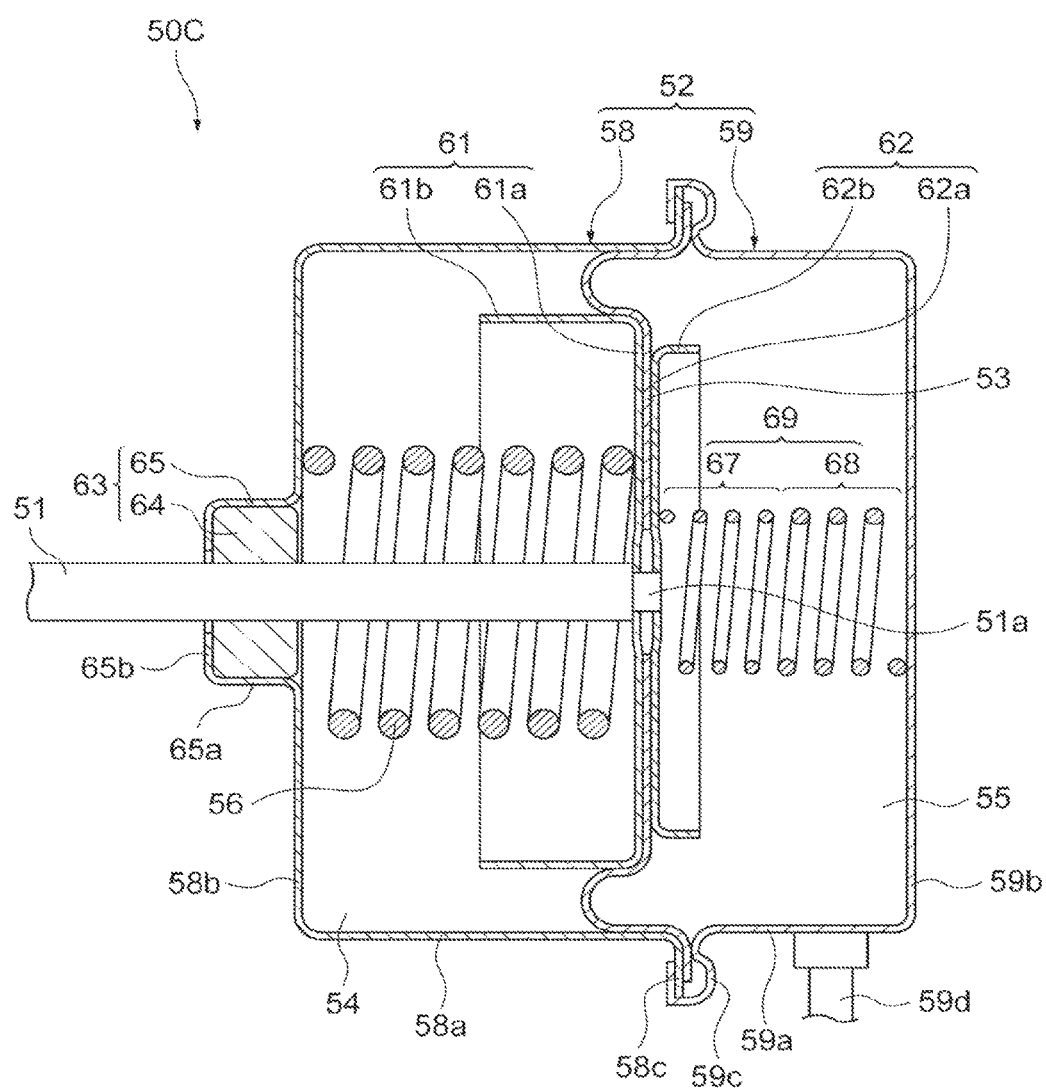
FIG. 6 is a cross-sectional view of a diaphragm type actuator according to a third embodiment of the disclosure.

Next, a diaphragm type actuator 50C according to a third embodiment will be described with reference to FIG. 6. The diaphragm type actuator 50C according to the third embodiment is different from the diaphragm type actuator 50 according to the first embodiment in that a compression coil spring 69 having a uniform coil diameter in the axial direction is provided instead of the compression coil spring 66 of which the coil diameter becomes smaller toward the other end side. Additionally, in the description of the third embodiment, the same description as those of the first and second embodiments will be omitted.

The compression coil spring 69 includes a first elastic portion 67 which is disposed at the other end side and a second elastic portion 68 which is disposed at one end side. The first elastic portion 67 is a portion which is located at the other end side of the compression coil spring 69 and the second elastic portion 68 is a portion which is located at one end side of the compression coil spring 69. The wire diameter of the coil of the first elastic portion 67 is smaller than the wire diameter of the coil of the second elastic portion 68. In other words, the spring coefficient of the first elastic portion 67 is lower than the spring coefficient of the second elastic portion 68.

One end portion of the second elastic portion 68 comes into contact with the inner wall surface of the rear surface wall 59b of the high pressure chamber 55. The other end portion of the second elastic portion 68 is continuous to one end portion of the first elastic portion 67. The other end portion of the first elastic portion 67 comes into contact with the retainer body 62a of the high pressure side retainer 62.

The outer diameter of the coil of the compression coil spring 69 is smaller than the outer diameter of the coil of the return spring 56. The wire diameters of the coils of the first elastic portion 67 and the second elastic portion 68 are smaller than the wire diameter of the coil of the return spring 56. Then, the spring coefficient of the compression coil spring 69 is lower than the spring coefficient of the return spring 56.

A force acting on the high pressure chamber 55 in the diaphragm 53 is first absorbed by the first elastic portion 67 having a low spring coefficient and then is absorbed by the second elastic portion 68 having a high spring coefficient. For that reason, it is possible to comparatively weakly absorb a force acting on the diaphragm 53 when the movement amount of the diaphragm 53 toward the high pressure chamber 55 is small. When the movement amount of the diaphragm 53 toward the high pressure chamber 55 further increases, it is possible to more strongly absorb a force acting on the diaphragm 53. That is, it is possible to more strongly absorb a force acting on the diaphragm 53 when the diaphragm 53 moves to a position closest to the rear surface wall 59b.

Also in the diaphragm type actuator 50C according to the third embodiment, it is possible to obtain the same operation and effect as those of the diaphragm type actuator 50 of the first embodiment and to suppress a contact sound generated when the valve body 23 hits the peripheral edge portion of the opening portion of the bypass passage 17.

Additionally, in the third embodiment, the other end portion of the first elastic portion 67 comes into contact with the high pressure side retainer 62, but the other end portion of the first elastic portion 67 may not come into contact with the high pressure side retainer 62 while the diaphragm 53 moves toward the low pressure chamber 54. In summary, the diaphragm 53 may be urged toward the low pressure chamber 54 by the compression coil spring 69 before the valve body 23 of the waste gate valve 20 contacts the valve seat which is the peripheral edge portion of the opening portion after the diaphragm 53 moves toward the high pressure chamber 55.

Further, in the third embodiment, the outer diameter of the coil of the first elastic portion 67 is the same as the outer diameter of the coil of the second elastic portion 68, but the outer diameters of the coils of the first elastic portion 67 and the second elastic portion 68 may be different from each other. The outer diameter of the coil of the first elastic portion 67 may be smaller than the outer diameter of the coil of the second elastic portion 68.

In the third embodiment, the wire diameter of the coil of the first elastic portion 67 and the wire diameter of the coil of the second elastic portion 68 are changed so that the spring coefficient of the first elastic portion 67 is set to be lower than the spring coefficient of the second elastic portion 68, but the spring coefficients may be changed by other methods. For example, the spring coefficient may be changed by changing the material of the coil.

In the third embodiment, the compression coil spring 69 includes two portions (the first elastic portion 67 and the second elastic portion 68) having different spring coefficients, but may be a compression coil spring including three or more portions having different spring coefficients.

In the third embodiment, the first elastic portion 67 and the second elastic portion 68 are continuously formed, but the first elastic portion 67 and the second elastic portion 68 may be connected to each other through other members.

Fourth Embodiment

Figure 7:
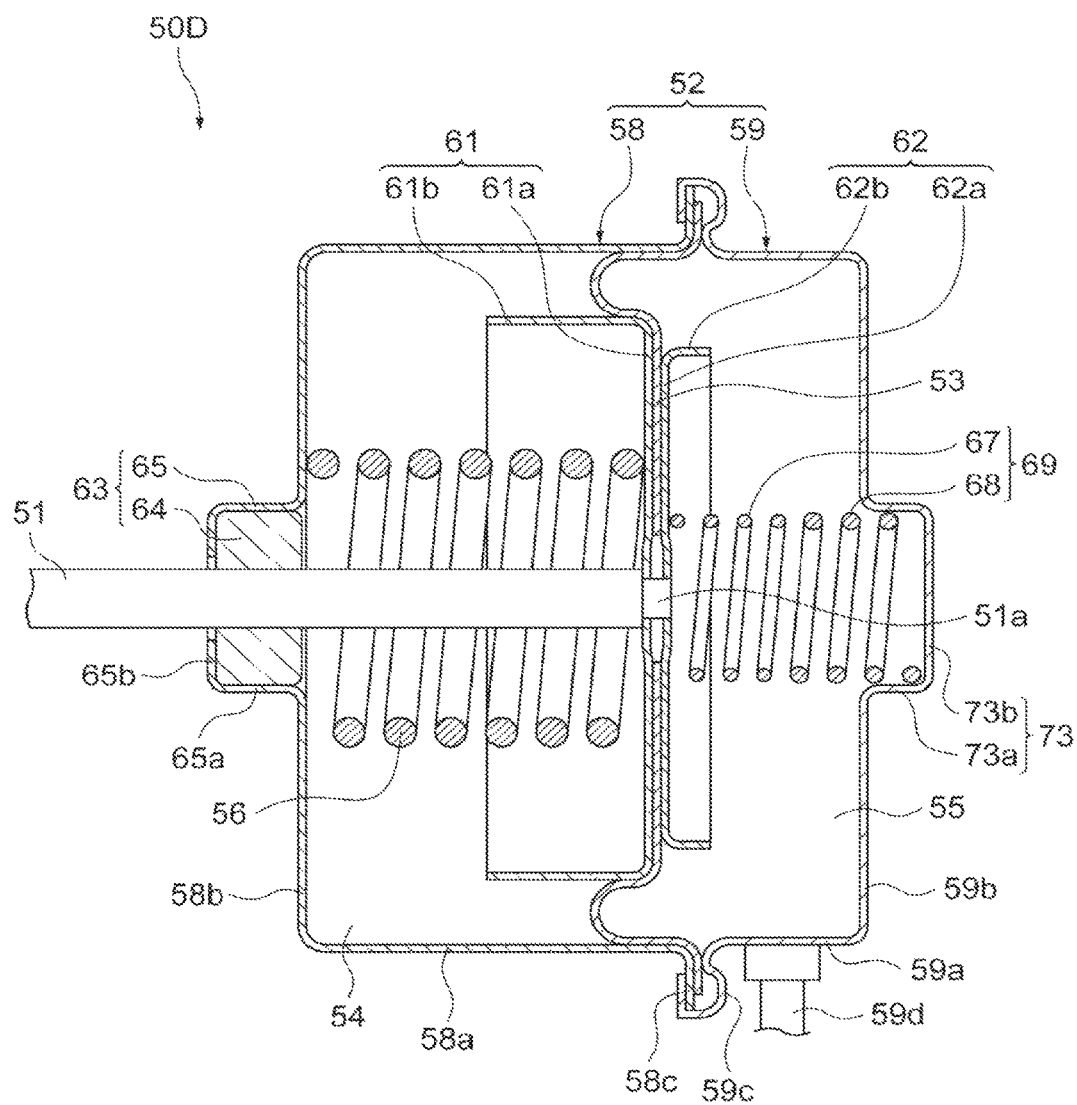
FIG. 7 is a cross-sectional view of a diaphragm type actuator according to a fourth embodiment of the disclosure.

Next, a diaphragm type actuator 50D according to a fourth embodiment will be described with reference to FIG. 7. The diaphragm type actuator 50D according to the fourth embodiment is different from the diaphragm type actuator 50C according to the third embodiment in that a holding portion 73 holding the compression coil spring 69 is provided. Additionally, in the description of the fourth embodiment, the same description as those of the first to third embodiments will be omitted.

The holding portion 73 is a concave portion which is formed in the rear surface wall 59b of the high pressure chamber 55. The holding portion 73 is recessed outward in the axial direction of the operation rod 51. The holding portion 73 includes a cylindrical portion 73a and a rear surface wall 73b. The cylindrical portion 73a is formed to protrude outward in the axial direction of the operation rod 51 from the rear surface wall 59b. The other end side of the cylindrical portion 73a is formed to be continuous to the rear surface wall 59b. The rear surface wall 73b of the holding portion 73 is formed to close one end side of the cylindrical portion 73a.

One end portion of the compression coil spring 69 is fitted to the holding portion 73. One end portion of the compression coil spring 69 comes into contact with the rear surface wall 73*b* of the holding portion 73. Further, the outer periphery of one end portion of the compression coil spring 69 comes into contact with the inner wall surface of the cylindrical portion 73*a* of the holding portion 73.

Also in the diaphragm type actuator 50D according to the fourth embodiment, it is possible to obtain the same operation and effect as those of the diaphragm type actuator 50C of the third embodiment and to suppress a contact sound generated when the valve body 23 hits the peripheral edge portion of the opening portion of the bypass passage 17.

Additionally, in the fourth embodiment, the holding portion 73 is recessed outward in the axial direction of the operation rod 51, but the holding portion may have other configurations. For example, the holding portion may be a convex portion which is formed in the rear surface wall 59*b* of the high pressure chamber 55. The holding portion corresponding to the convex portion is formed to protrude from the rear surface wall 59*b* toward the diaphragm 53 and the outer peripheral surface of the cylindrical portion forming the convex portion may come into contact with the inner periphery of the compression coil spring 69. Further, the holding portion may be an annular groove portion corresponding to the coil shape.

Fifth Embodiment

Figure 8:
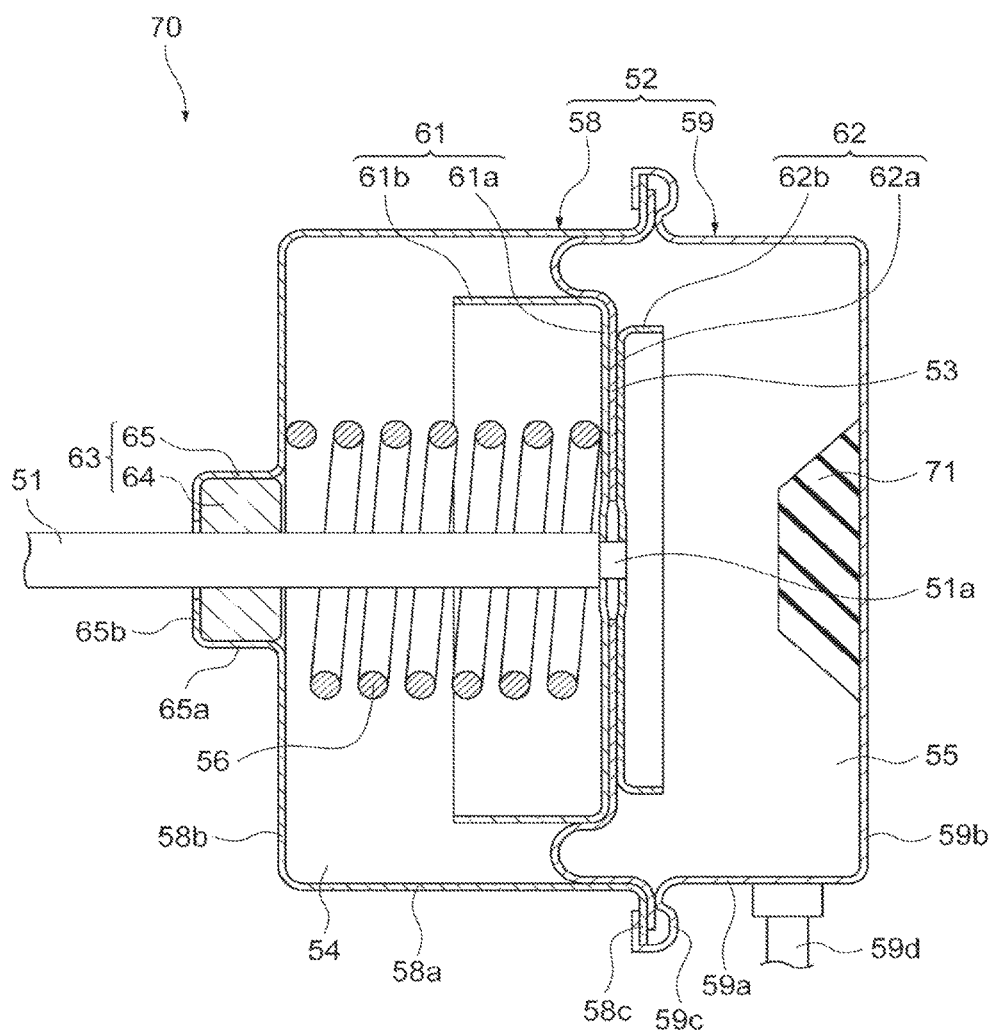
FIG. 8 is a cross-sectional view of a diaphragm type actuator according to a fifth embodiment of the disclosure.

Next, a diaphragm type actuator 70 according to a fifth embodiment will be described with reference to FIG. 8. The diaphragm type actuator 70 according to the fifth embodiment is different from the diaphragm type actuator 50 according to the first embodiment in that a rubber member (an absorption portion and an elastic member) 71 is provided instead of the compression coil spring 66. Additionally, in the description of the fifth embodiment, the same description as those of the first to fourth embodiments will be omitted.

The rubber member 71 is formed as a truncated conical body. One end portion of the rubber member 71 has a diameter larger than that of the other end portion. The outer diameter of the rubber member 71 becomes smaller as it goes from one end side toward the other end side. The other end portion of the rubber member 71 comes into contact with the inner wall surface of the rear surface wall 59*b* of the high pressure chamber 55 and one end portion of the rubber member 71 is disposed to face the retainer body 62*a* of the high pressure side retainer 62. For example, one end portion of the rubber member 71 is stuck to the inner wall surface of the rear surface wall 59*b*. The other end portion of the rubber member 71 is disposed to be separated from the high pressure side retainer 62 in the axial direction when the diaphragm 53 is disposed at an intermediate position between the low pressure side cup portion 58 and the high pressure side cup portion 59.

The material of the rubber member 71 is, for example, a heat-resistant rubber such as silicone rubber and chloroprene rubber. Additionally, the temperature inside the high pressure chamber 55 is, for example, 100° C. in the use state of the turbocharger 1.

Also in the diaphragm type actuator 70 according to the fifth embodiment, it is possible to obtain the same operation and effect as those of the diaphragm type actuator 50 of the first embodiment and to suppress a contact sound generated when the valve body 23 hits the peripheral edge portion of the opening portion of the bypass passage 17.

Additionally, in the fifth embodiment, the rubber member 71 is formed as a truncated conical body, but the rubber member 71 may have other shapes. The rubber member 71 may be formed in, for example, a columnar shape, a cylindrical shape, or a prismatic shape.

Sixth Embodiment

Figure 9:
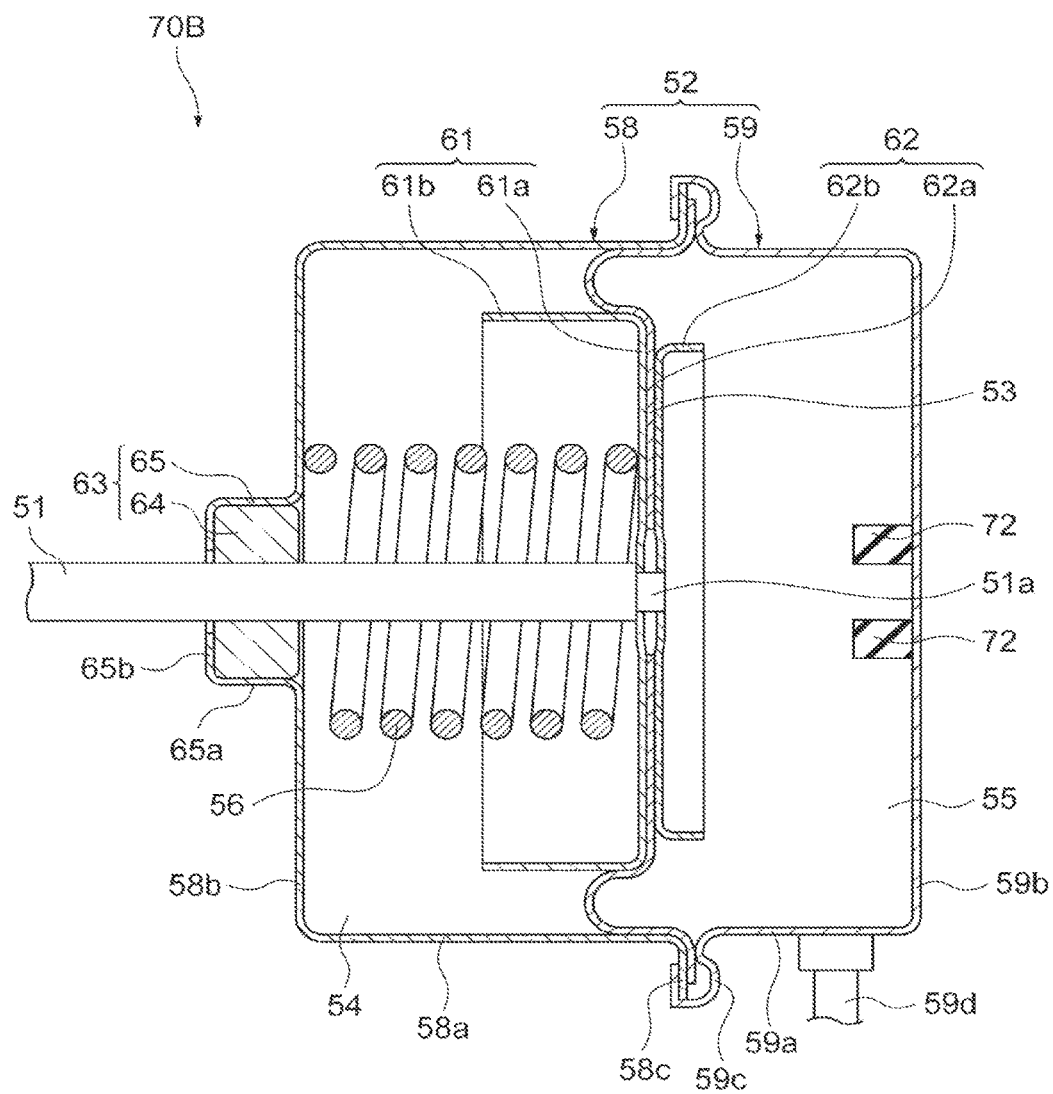
FIG. 9 is a cross-sectional view of a diaphragm type actuator according to a sixth embodiment of the disclosure.

Next, a diaphragm type actuator 70B according to a sixth embodiment will be described with reference to FIG. 9. The diaphragm type actuator 70B according to the sixth embodiment is different from the diaphragm type actuator 70 according to the sixth embodiment in that a pair of rubber members (an absorption portion and an elastic member) 72 are provided instead of the rubber member 71 formed as a truncated conical body. Additionally, in the description of the sixth embodiment, the same description as those of the first to fifth embodiments will be omitted.

The pair of rubber members 72 are formed in, for example, columnar shapes. The pair of rubber members 72 are disposed to be separated from each other in the radial direction of the operation rod 51. Additionally, three or more rubber members 72 may be provided.

Also in the diaphragm type actuator 70B according to the sixth embodiment, it is possible to obtain the same operation and effect as those of the diaphragm type actuator 70 of the fifth embodiment and to suppress a contact sound generated when the valve body 23 hits the peripheral edge portion of the opening portion of the bypass passage 17.

Seventh Embodiment

Figure 10:
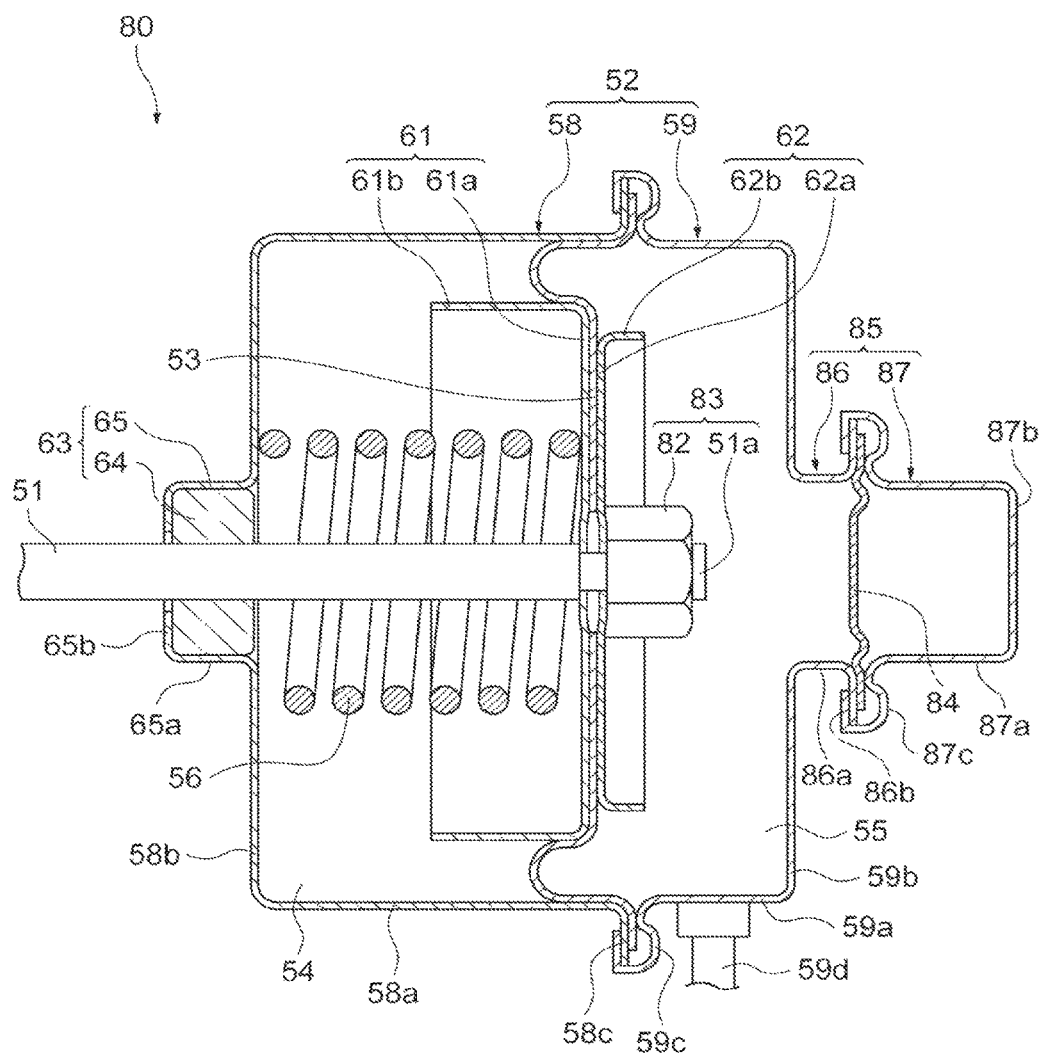
FIG. 10 is a cross-sectional view of a diaphragm type actuator according to a seventh embodiment of the disclosure.

Next, a diaphragm type actuator 80 according to a seventh embodiment will be described with reference to FIG. 10. The diaphragm type actuator 80 according to the seventh embodiment is different from the diaphragm type actuator 50 according to the first embodiment in that a method of connecting the diaphragm 53 to one end portion 51*a* of the operation rod 51 is different and the configuration of the absorption portion is different. Additionally, in the description of the seventh embodiment, the same description as those of the first to sixth embodiments will be omitted.

One end portion 51*a* of the operation rod 51 is formed to protrude toward the inside of the high pressure chamber 55 in relation to the high pressure side retainer 62. One end portion 51*a* is provided with a screw portion and a nut 82 is attached to the screw portion. When the nut 82 is fastened to the screw portion of one end portion 51*a*, the low pressure side retainer 61, the diaphragm 53, and the high pressure side retainer 62 are connected to one end portion 51*a* of the operation rod 51. In the diaphragm type actuator 80, a protrusion portion 83 is formed at one end side of the operation rod 51 to protrude toward the inside of the high pressure chamber 55 from the diaphragm 53. The protrusion portion 83 is formed by attaching the nut 82 to one end portion 51*a* of the operation rod 51.

The diaphragm type actuator 80 includes an absorption diaphragm (an absorption film and an absorption portion) 84 which is disposed to face the protrusion portion 83 in the axial direction and a support portion 85 which supports the absorption diaphragm 84. The absorption diaphragm 84 is an elastic film member.

The support portion 85 is formed to be recessed outward from the rear surface wall 59*b* in the axial direction of the operation rod 51. The support portion 85 includes a projection portion 86 which protrudes outward from the rear surface wall 59*b* and a sealing cup portion 87 which is attached to the projection portion 86. The projection portion 86 includes a cylindrical portion 86*a* and a flange portion 86*b* which is provided at one end side of the cylindrical portion 86*a*. The flange portion 86*b* protrudes outward in the radial direction from the peripheral edge portion of the opening portion at one end side of the cylindrical portion 86*a*.

The sealing cup portion 87 includes a cylindrical portion 87*a* and a rear surface wall 87*b*. The cylindrical portion 87*a* has the same inner diameter as that of the cylindrical portion 86*a*. The rear surface wall 87*b* is formed to close one end side of the cylindrical portion 87*a*. The other end side of the cylindrical portion 87*a* is provided with a flange portion 87*c* which protrudes outward in the radial direction of the cylindrical portion 87*a* from the peripheral edge portion of the opening portion.

The cylindrical portion 86*a* and the cylindrical portion 87*a* are bonded to each other so that the opening portions thereof face each other with the absorption diaphragm 84 interposed therebetween in the axial direction of the operation rod 51. The absorption diaphragm 84 is formed in, for example, a circular shape and the peripheral edge portion of the absorption diaphragm 84 is sandwiched by the flange portions 86*b* and 87*c*. For example, air is enclosed in the sealing cup portion 87. Further, a liquid may be enclosed in the sealing cup portion instead of air. The flange portions 86*b* and 87*c* are bonded to each other by, for example, caulking. The flange portions 86*b* and 87*c* may be bonded to each other by, for example, welding, threading, or other connection methods.

The absorption diaphragm 84 has an outer shape larger than the inner diameters of the cylindrical portions 86*a* and 87*a*. Inside the cylindrical portions 86*a* and 87*a*, the center portion of the absorption diaphragm 84 is movable in the axial direction of the operation rod 51.

In such a diaphragm type actuator 80, when the center portion of the diaphragm 53 moves toward the high pressure chamber 55, the protrusion portion 83 enters the cylindrical portion 86*a* and comes into contact with the absorption diaphragm 84. When the center portion of the diaphragm 53 further moves toward the high pressure chamber 55, the protrusion portion 83 is urged toward the low pressure chamber 54 by the absorption diaphragm 84. Accordingly, a force in which the diaphragm 53 is urged by the return spring 56 is absorbed as the diaphragm 53 moves to a position closest to the rear surface wall 59*b*. In a state where the diaphragm 53 moves to a position closest to the rear surface wall 59*b*, an urging force of the absorption diaphragm 84 becomes maximal and a force in which the diaphragm 53 is urged toward the high pressure chamber 55 is weakened.

Thus, a force acting on the diaphragm 53 is absorbed when the center portion of the diaphragm 53 moves to a position closest to the rear surface wall 59*b* of the high pressure chamber 55 and stops. For that reason, a driving force generated by the operation rod 51 when the operation rod 51 is returned to one end side and stops therein is reduced. As a result, it is possible to weaken a force in which the valve body 23 hits the peripheral edge portion and to suppress a contact sound generated when the valve body 23 hits the peripheral edge portion when the valve body 23 comes into contact with the peripheral edge portion of the opening portion of the bypass passage 17.

Eighth Embodiment

Figure 11:
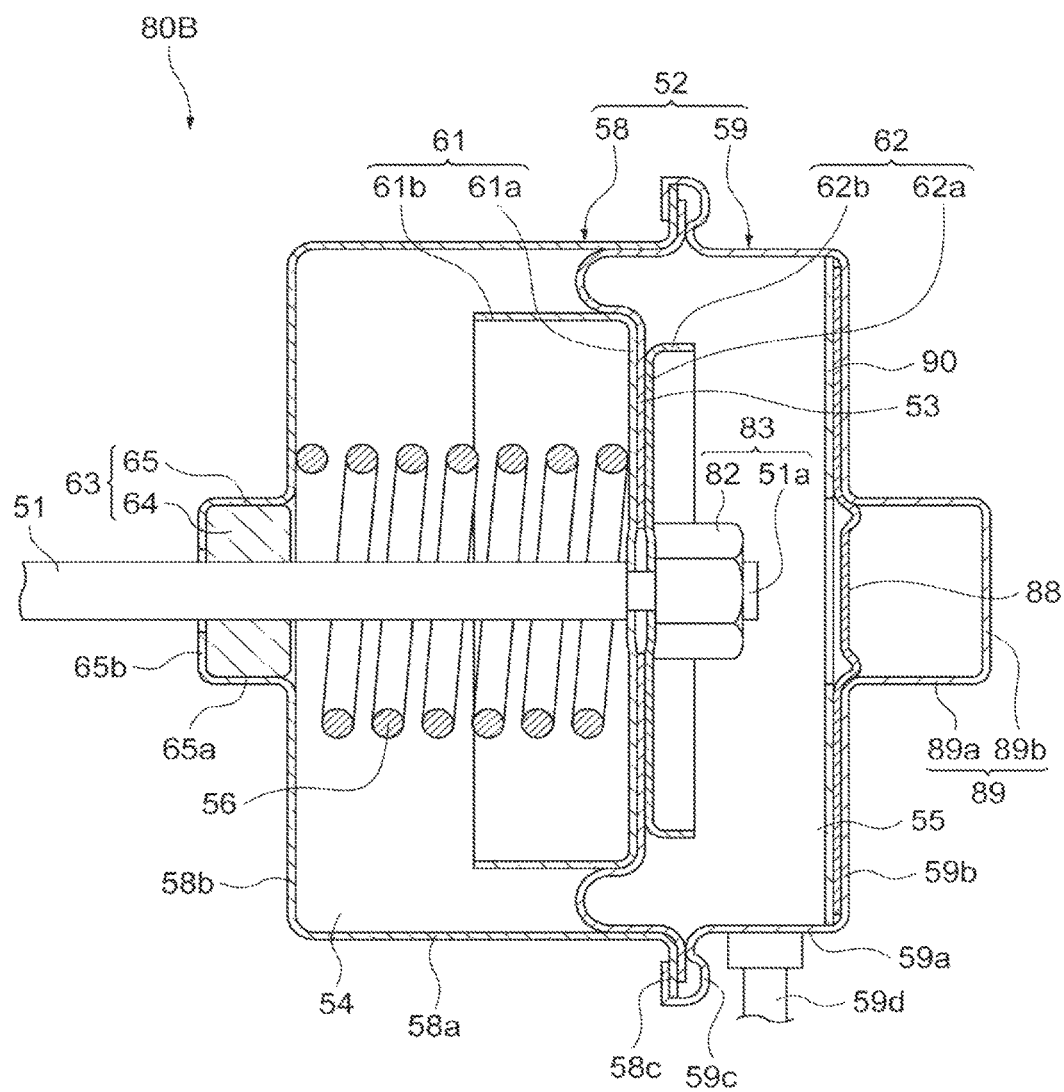
FIG. 11 is a cross-sectional view of a diaphragm type actuator according to an eighth embodiment of the disclosure.

Next, a diaphragm type actuator 80B according to an eighth embodiment will be described with reference to FIG. 11. The diaphragm type actuator 80B according to the eighth embodiment is different from the diaphragm type actuator 80 according to the seventh embodiment in that a support method of the absorption diaphragm (the absorption portion) 88 is different. Additionally, in the description of the eighth embodiment, the same description as those of the first to seventh embodiments will be omitted.

The rear surface wall 59*b* of the high pressure chamber 55 is provided with a sealing portion 89 enclosing air therein. The sealing portion 89 includes a cylindrical portion 89*a* and a rear surface wall 89*b*. The cylindrical portion 89*a* is formed to protrude outward in the axial direction of the operation rod 51 from the rear surface wall 59*b* of the high pressure side cup portion 59. The other end side of the cylindrical portion 89*a* is formed to be continuous to the rear surface wall 59*b* of the high pressure side cup portion 59. The rear surface wall 89*b* of the sealing portion 89 is formed to close one end side of the cylindrical portion 89*a*. Further, air is enclosed in the sealing portion 89.

The absorption diaphragm 88 is disposed to cover the sealing portion 89 and the inner wall surface of the rear surface wall 59*b*. The absorption diaphragm 88 is stuck to the inner wall surface of the rear surface wall 59*b* by, for example, an adhesive so as to prevent the leakage of the air enclosed in the sealing portion 89. Further, the absorption diaphragm 88 is pressed against the rear surface wall 59*b* from the low pressure chamber 54 by a washer 90. The washer 90 is press-inserted into the cylindrical portion 59*a* of the high pressure side cup portion 59. The absorption diaphragm 88 is sandwiched by the rear surface wall 59*b* and the washer 90 in the axial direction of the operation rod 51. The center opening portion of the washer 90 is disposed to correspond to the cylindrical portion 89*a*. The absorption diaphragm 88 is sandwiched by the washer 90 and the rear surface wall 59*b* and the center portion of the absorption diaphragm 88 comes into contact with the protrusion portion 83 moving toward the high pressure chamber 55 to be movable inside the cylindrical portion 89*a*.

In such a diaphragm type actuator 80B, when the center portion of the diaphragm 53 moves toward the high pressure chamber 55, the diaphragm comes into contact with the absorption diaphragm 88. When the center portion of the diaphragm 53 further moves toward the high pressure chamber 55, the protrusion portion 83 enters the cylindrical portion 89*a* and a force acting on the protrusion portion 83 is absorbed by the air enclosed in the sealing portion 89. For that reason, a force in which the diaphragm 53 is urged by the return spring 56 is absorbed as the diaphragm 53 moves close to the rear surface wall 59*b*.

Thus, a driving force generated by the operation rod 51 when the operation rod 51 is returned to one end side and stops therein is reduced. As a result, it is possible to weaken a force generated when the valve body 23 hits the peripheral edge portion and to suppress a contact sound generated when the valve body 23 hits the peripheral edge portion when the valve body 23 comes into contact with the peripheral edge portion of the opening portion of the bypass passage 17.

Ninth Embodiment

Figure 12:
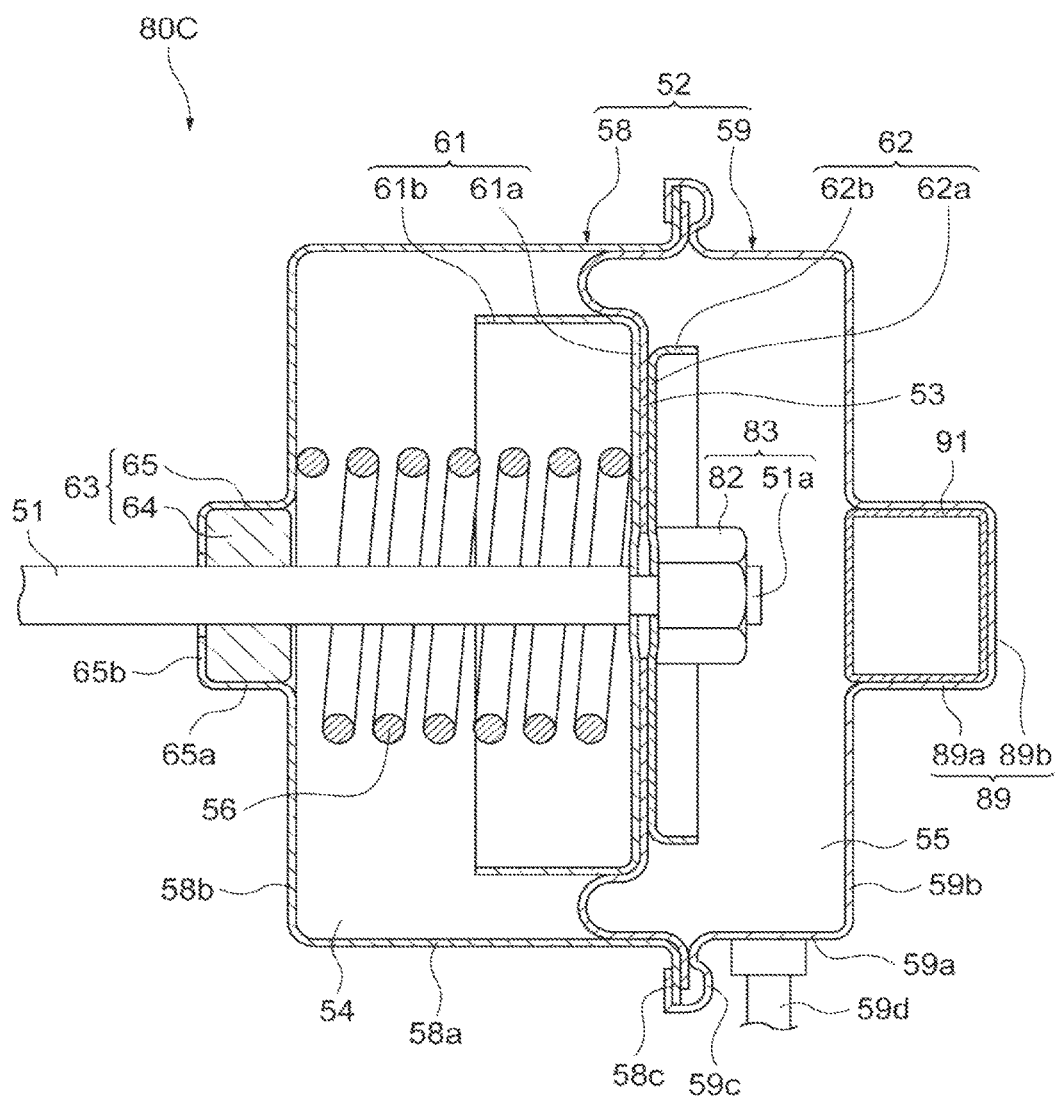
FIG. 12 is a cross-sectional view of a diaphragm type actuator according to a ninth embodiment of the disclosure.

Next, a diaphragm type actuator 80C according to a ninth embodiment will be described with reference to FIG. 12. The diaphragm type actuator 80C according to the ninth embodiment is different from the diaphragm type actuator 80B according to the eighth embodiment in that the configuration of an absorption portion 91 is different.

For example, the diaphragm type actuator 80C includes the absorption portion 91 in which air is enclosed in a hollow columnar body formed of an elastic rubber. The absorption portion 91 is inserted into the sealing portion 89 and is held therein.

Also in the diaphragm type actuator 80C according to the ninth embodiment, it is possible to obtain the same operation and effect as that of the diaphragm type actuator 80B of the eighth embodiment and to suppress a contact sound generated when the valve body 23 hits the peripheral edge portion of the opening portion of the bypass passage 17.

The invention is not limited to the above-described embodiments and can be modified into various forms without departing from the spirit of the invention.

In the above-described embodiments, the diaphragm type actuator 50 is used as the driving source of the waste gate valve 20 of the turbocharger 1, but may be used as a driving source for opening and closing other valves. Further, the diaphragm type actuator 50 may be used as a driving source for driving an object other than the valve.

In the above-described embodiments, a configuration in which the compression coil spring, the rubber member, or the absorption diaphragm is provided as the absorption portion has been described, but the absorption portion may have a different configuration. For example, other spring members such as a disc spring and a plate spring may be provided instead of the compression coil spring. The absorption portion may be used to absorb (reduce) a force acting on the diaphragm when the diaphragm moves toward the high pressure chamber and stops therein.

In the above-described embodiments, the high pressure side retainer 62 includes the protrusion portion 62b which protrudes toward the inside of the high pressure chamber 55, but the high pressure side retainer 62 may not include the protrusion portion 62b which protrudes toward the inside of the high pressure chamber 55. Further, the protrusion portion 62b may not protrude from the outer peripheral portion of the retainer body 62a and may protrude from the intermediate portion in the radial direction.

In the above-described embodiments, a configuration in which the retainer body 62a or the protrusion portion 83 comes into contact with the absorption portion has been described, but a force acting on the diaphragm 53 may be absorbed in such a manner that the other portions come into contact with the absorption portion. For example, a force acting on the diaphragm 53 may be absorbed in such a manner that the protrusion portion 62b of the high pressure side retainer 62 comes into contact with the absorption portion.

In the above-described embodiments, the turbocharger 1 which employs the waste gate valve 20 is used for a vehicle, but the turbocharger is not limited to the application to the vehicle and may be used in a ship engine or other engines.

INDUSTRIAL APPLICABILITY

According to some aspects of the disclosure, it is possible to reduce a driving force generated by an operation rod when the operation rod is returned to one end side.

REFERENCE SIGNS LIST

1: turbocharger
50, 50B, 50C, 50D, 70, 70B, 80, 80B, 80C: diaphragm type actuator
51: operation rod
51a: one end portion
52: actuator body
53: diaphragm
54: low pressure chamber
55: high pressure chamber
56: return spring
59b: rear surface wall (wall surface facing diaphragm)
62: high pressure side retainer
66, 66B, 69: compression coil spring (absorption portion and elastic member)
66a: coil (first coil)
66b: coil (second coil)
67: first elastic portion
68: second elastic portion
71, 72: rubber member (absorption portion and elastic member)
73: holding portion
83: protrusion portion
84, 88: absorption diaphragm (absorption portion and absorption film)
89: sealing portion
91: absorption portion

The invention claimed is:

1. A diaphragm type actuator which drives an operation rod in an axial direction of the operation rod, comprising:
a diaphragm which is connected to the operation rod;
a high pressure chamber which is adjacent to a first end side of the diaphragm in the axial direction;
a low pressure chamber which is adjacent to a second end side of the diaphragm in the axial direction;
a return spring which is provided in the low pressure chamber and urges the diaphragm toward the high pressure chamber; and
an absorption portion which is provided in a wall surface facing the diaphragm in the high pressure chamber,
wherein the absorption portion includes an elastic member that is provided in the wall surface facing the diaphragm in the high pressure chamber and is disposed to face the diaphragm in the axial direction,
wherein the elastic member is a compression coil spring disposed along the axial direction, the elastic member including a first elastic portion which is a first portion of the compression coil spring near the diaphragm and a second elastic portion which is a second portion of the compression coil spring near the wall surface, and
wherein a spring coefficient of the first elastic portion is lower than a spring coefficient of the second elastic portion.

2. A diaphragm type actuator which drives an operation rod in an axial direction of the operation rod, comprising:
a diaphragm which is connected to the operation rod;
a high pressure chamber which is adjacent to a first end side of the diaphragm in the axial direction;
a low pressure chamber which is adjacent to a second end side of the diaphragm in the axial direction;
a return spring which is provided in the low pressure chamber and urges the diaphragm toward the high pressure chamber; and
an absorption portion which is provided in a wall surface facing the diaphragm in the high pressure chamber,
wherein the absorption portion includes an elastic member that is provided in the wall surface facing the diaphragm in the high pressure chamber and is disposed to face the diaphragm in the axial direction,
wherein the elastic member is a compression coil spring which is disposed along the axial direction,
wherein the compression coil spring is formed so that an outer diameter of a coil becomes smaller from the first end side toward the second end side, and wherein a first coil of the compression coil spring disposed at the second end side is disposed at an inside in a radial direction in relation to a second coil of the compression coil spring adjacent to the first end side of the first coil.

3. A diaphragm type actuator which drives an operation rod in an axial direction of the operation rod, comprising:
   a diaphragm which is connected to the operation rod;
   a high pressure chamber which is adjacent to a first end side of the diaphragm in the axial direction;
   a low pressure chamber which is adjacent to a second end side of the diaphragm in the axial direction;
   a return spring which is provided in the low pressure chamber and urges the diaphragm toward the high pressure chamber; and
   an absorption portion which is provided in a wall surface facing the diaphragm in the high pressure chamber,
   wherein a protrusion portion which protrudes toward an inside of the high pressure chamber from the diaphragm is provided at the first end side of the operation rod, and
   wherein the absorption portion includes an absorption film which is disposed to face the protrusion portion in the axial direction.

4. The diaphragm type actuator according to claim 3, wherein a concave portion which receives the protrusion portion is formed in the wall surface facing the diaphragm in the high pressure chamber, and
   wherein the absorption portion is disposed in the concave portion.

* * * * *